United States Patent [19]

Brussalis, Jr.

[11] Patent Number: 4,483,500
[45] Date of Patent: Nov. 20, 1984

[54] PIPING SUPPORT SYSTEM FOR LIQUID-METAL FAST-BREEDER REACTOR

[75] Inventor: William G. Brussalis, Jr., Forward Township, Washington County, Pa.

[73] Assignee: The United States of American as represented by the United States Department of Energy, Washington, D.C.

[21] Appl. No.: 378,447

[22] Filed: May 14, 1982

Related U.S. Application Data

[63] Continuation-in-part of Ser. No. 267,824, May 27, 1981, abandoned.

[51] Int. Cl.³ .............................................. F16L 3/00
[52] U.S. Cl. ................................. 248/58; 248/DIG. 1
[58] Field of Search ............... 248/58, 59, 60, DIG. 1, 248/282, 283, 284, 49; 52/573; 137/356, 357

[56] References Cited

U.S. PATENT DOCUMENTS

| | | | |
|---|---|---|---|
| 1,315,890 | 9/1919 | Wheeler | 248/59 |
| 2,339,565 | 1/1944 | Goldberg et al. | 248/59 |
| 2,707,128 | 4/1955 | Greenfield | 248/284 |
| 2,912,198 | 11/1959 | Feil | 248/60 |
| 3,044,739 | 7/1962 | Attwood | 248/58 |
| 3,112,909 | 12/1963 | Suozzo et al. | 248/58 |
| 3,288,406 | 11/1966 | Degen | 248/49 |
| 3,493,206 | 2/1970 | Albro | 248/59 |
| 3,539,136 | 11/1970 | Suozzo | 248/59 |
| 4,194,711 | 3/1980 | Winton | 248/49 |
| 4,299,364 | 11/1981 | Loniello | 248/58 |
| 4,309,019 | 1/1982 | Bloom | 248/60 |

Primary Examiner—William H. Schultz
Assistant Examiner—Ramon O. Ramirez

[57] ABSTRACT

A pipe support consisting of a rigid link pivotally attached to a pipe and an anchor, adapted to generate stress or strain in the link and pipe due to pipe thermal movement, which stress or strain can oppose further pipe movement and generally provides pipe support. The pipe support can be used in multiple combinations with other pipe supports to form a support system. This support system is most useful in applications in which the pipe is normally operated at a constant elevated or depressed temperature such that desired stress or strain can be planned in advance of pipe and support installation. The support system is therefore especially useful in steam stations and in refrigeration equipment.

6 Claims, 17 Drawing Figures

ROOM TEMPERATURE

ROOM TEMPERATURE

OPERATIVE TEMPERATURE

ROOM TEMPERATURE

OPERATING TEMPERATURE

PIPING SUPPORT SYSTEM FOR LIQUID-METAL FAST-BREEDER REACTOR

CROSS REFERENCE TO RELATED APPLICATION

This is a continuation-in-part of Ser. No. 267,824, filed May 27, 1981, now abandoned.

GOVERNMENT CONTRACT

This invention was conceived during performance of a contract with the United States Government designated DE-AC-14-79-ET-37107.

BACKGROUND OF THE INVENTION

1. Field of the Invention

This invention relates in general to a device for supporting and/or controlling movement of equipment, especially piping, subject to changes in position due to thermal expansion and contraction. The device has several functions and may advantageously be used, by way of example, as a constant support, a shock, vibration or sway arrestor and as a positioner. All of these functions are collectively referred to as "support" herein.

2. Description of Prior Art

Pipes are often supported by snubbers—a restraint which allows a pipe to move freely if movement is slow, but which resists rapid movement—and by hangers which apply a constant force to the pipe.

Many other devices exist which support piping systems, which devices accommodate changes in pipe dimensions due to thermal heat-up and cool-down.

Support devices tend to be complicated, and therefore costly, subject to failure, and may require routine maintenance and testing. It is desired to provide a device which will support piping which device is mechanically simple, thereby reducing installation and maintenance costs.

SUMMARY OF THE INVENTION

The invention is a pivotal rigid link equipment/pipe support, or a system comprising a plurality of supports including one or more pivotal rigid link supports.

A single rigid link support consists of a rigid link joined at one end to the pipe or equipment by pivotally free means of attachment and similarly joined at another end to a stationary anchor or surface. During pipe/equipment movement, the link pivots at both connections. The rigid link support is planned in advance of installation to use the forces and displacements generated by movement and dimensional changes in the pipe during pipe temperature changes to stress and/or pivot the rigid link such that the pipe is properly stressed and supported when at its long term operating temperature. The rigid link support does not merely accommodate thermal movement of the pipe, but utilizes such movement to regulate pipe stresses and to generate forces opposing further movement of the pipe.

The rigid link support prevents pipe/equipment movement along the length of the link and opposes motion in other directions by forcing any such motion to include an additional directional component imposed by a push or pull by the link.

It is not necessary that a rigid link be stressed at the operating temperature, but may, in fact, be planned to be then unstressed. Such a link would still prevent pipe/equipment movement along the link length and would also oppose other additional pipe movements.

Installation of the rigid link support can be planned such that the pipe/equipment is forced out of its natural free position at either or both operating and room temperatures, creating stress in and support for the pipe/equipment termed "springing".

The rigid link support is particularly adaptable to steam stations and refrigeration apparatus since piping therein is normally operated at a constant, known, elevated or reduced temperature.

DETAILED DESCRIPTION

The rigid link support has a rigid link fixed at one end to a pipe mount fixed to a pipe or other equipment and fixed at another end to an anchor mount on a structure considered immovable and suitable as an anchor for the support of the pipe or equipment. The method of attachment of the link allows the link to pivot at both attachment mounts. The length, and angle of installation of the link with respect to the pipe are chosen at a room temperature such that movement of the pipe due to thermal heatup or cooldown causes pivotal movement of the link, generating stress in the link (if needed) which stress provides pipe support. "Room Temperature" (RT) is defined as the ambient temperature existing in the pipe or equipment when not operating and presumably when the rigid link support is installed.

The rigid link support may be installed with appropriate link length and angle with respect to the pipe such that some pipe and link stress exists even at room temperature. This condition is called "RT sprung" herein and an analogous condition called "operating temperature sprung" or "O.T. sprung" will be defined later. The condition called "RT sprung" is generally termed "cold sprung" in the art, but is redesignated here to avoid confusion since the rigid link support is applicable to systems which operate at temperatures below that temperature at which the springing is done.

Figure 1:
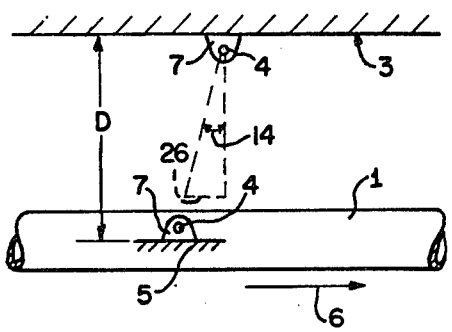
FIG. 1 illustrates a pipe at room temperature.

Refer to FIG. 1 which shows a pipe 1 at room temperature for which support is to be provided. Mounts 7 are shown installed to anchor 3 and pipe 1. Pins 4 are provided for attachment of a rigid link (not shown).

It is assumed that it is known by analysis of the system of which pipe 1 is a part that the thermal change from room temperature to the pipe 1 operating temperature, be it hotter or colder, causes an expansion (or contraction) of pipe 1 which causes pipe 1 to move to the right in the direction of arrow 6.

Figure 2:
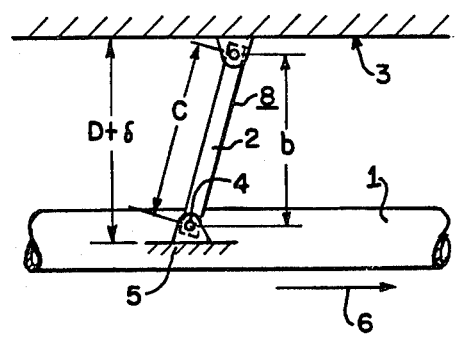
FIG. 2 is a view in side elevation of a rigid link support cooperatively associated with piping, shown in a stressed room temperature condition.

In FIG. 2, link 2 has been installed. Pipe 1 is still at room temperature, but due to the length of link 2 being greater than the distance between pins 4 in FIG. 1, installation of link 2 as shown in FIG. 2 has pushed pipe 1 downward. Consequently the distance between pipe 1 and anchor surface 3 has increased a distance $\delta$ from FIG. 1 and both rigid link 2 and pipe 1 are under stress and are RT sprung.

Figure 3:
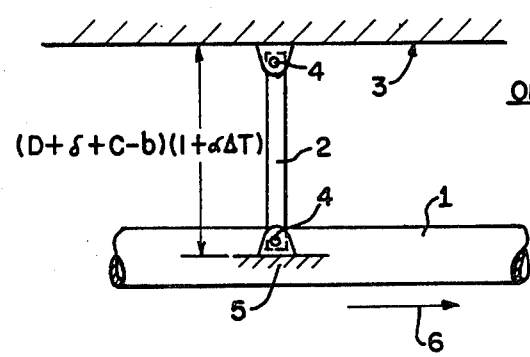
FIG. 3 shows the configuration change which occurs from FIG. 2 when the pipe changes temperature.

Refer to FIG. 3 which shows the system in the configuration resulting from a thermal change of pipe 1 from room temperature to operating temperature. Pipe 1 has shifted in the direction of arrow 6 (in FIG. 2) and has pivoted at pins 4, pushing pipe 1 downward by a distance equal to C, the length of link 2, less the distance b which is a side of a right triangle of which C is the hypotenuse as illustrated in FIG. 2.

Pipe 1 is also pushed down a small distance additionally due to any rigid link 2 thermal expansion (or, if link 2 is cooled during the thermal change which occurs to the operating temperature, this effect reduces the distance pipe 1 is pushed down). The change in rigid link 2 length is expressed as $\alpha \Delta T$ where $\alpha$ is the coefficient of expansion (of link 2) and $\Delta T$ is the temperature change of link 2 from room temperature to the operating temperature, of link 2 ($\Delta T$ may be a positive or negative quantity. The exact details of this calculation depends on the overall configuration involving the supports and the building as well as the temperature and expansion coefficients of the building, link, and mounts.) Pipe radial growth is not important when pipe 1 is supported as in FIG. 3.

In FIG. 3, pipe 1 is shown to be pushed down to a distance $(D+\delta+C-b)(1+\alpha\Delta T)$ from anchor surface 3.

The distance pipe 1 shifts (along arrow 6) for a specific $\Delta T$ is often a known quantity. This shift distance is represented by a dotted line 26 in FIG. 1. Angle 14 (in FIG. 1) and link 2 length can be chosen such that the stress in link 2 and pipe 1 in the configuration shown in FIG. 3 at the pipe 1 operating temperature is an acceptable and desired value.

Figure 4:
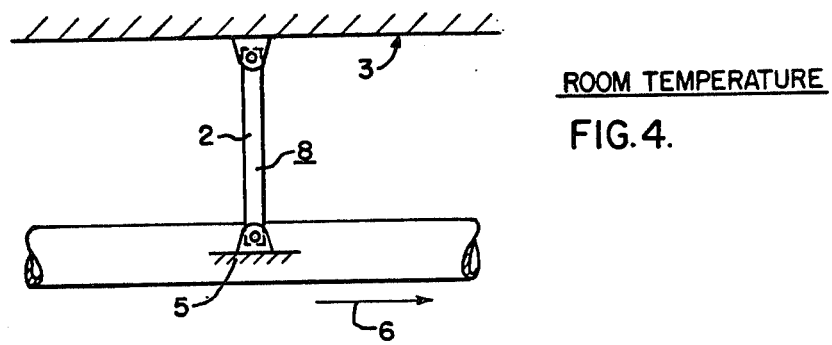
FIG. 4 is a view in side elevation of a rigid link support cooperatively associated with piping at room temperature.
Figure 5:
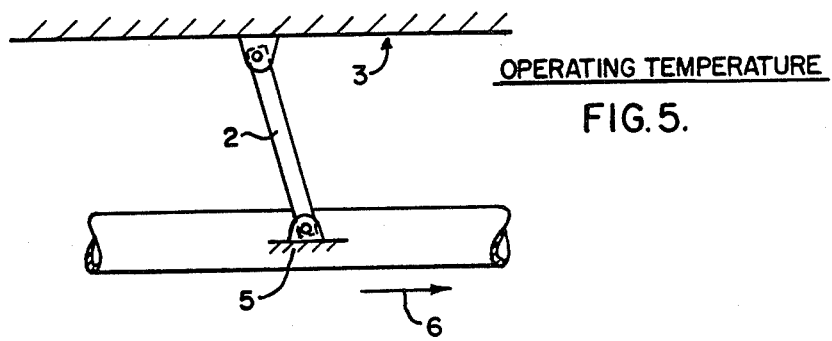
FIG. 5 relates to FIG. 4, showing the configuration change which occurs from FIG. 4 when the pipe changes temperature.

The configuration depicted in FIGS. 1, 2, and 3 is appropriate to *push* pipe 1 further away from anchor surface 3 during heatup (or cooldown). The rigid link support system can also be arranged to *pull* pipe 1 closer to anchor surface 3 during heatup (or cooldown) as illustrated in FIGS. 4 and 5. FIG. 4 shows an installed rigid link support 8 for a pipe 1 at room temperature; If pipe 1 is pulled upward somewhat by link 2 in FIG. 4 it is RT sprung. Pipe 1 is known to move to the right in the direction of arrow 6 during a temperature change to the operating temperature (shown in FIG. 5).

As shown in FIG. 5, movement of pipe 1 to the right causes link 2 to lift pipe 1 generating stress in pipe 1 and strain in link 2, these being appropriate to support pipe 1. If link 2 lifts pipe 1 more than any possible natural lifting of pipe 1 due to the thermal change, then the stress in link 2 will be tensile.

If pipe 1 is caused to move upward toward anchor surface 3 a distance greater than link 2 allows as pipe 1 moves to the right by the temperature change, then compressive stress could be generated in link 2.

Figure 6:
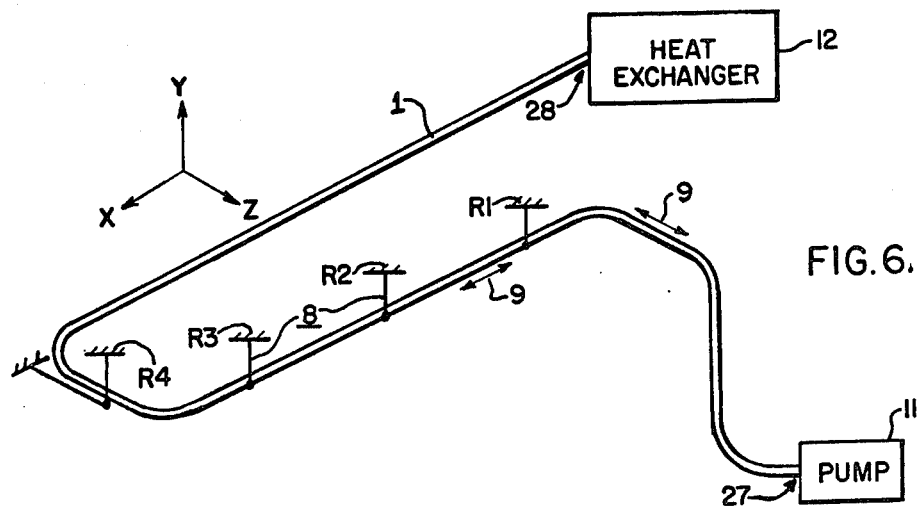
FIG. 6 is a schematic showing a piping system supported by a combination of rigid link supports with snubbers.

A pipe or system of pipes may be supported by a plurality of rigid link supports, of the "push" variety (see FIGS. 1, 2, 3) and/or "pull" variety (see FIGS. 4, 5) or a combination of these with other types of pipe supports. FIG. 6 illustrates a system designed to support pipe 1 with rigid link supports 8, and a snubber 9. Pipe 1 connects a pump 11 and a heat exchanger 12. Such a system can be planned prior to construction of the piping system with each rigid link support 8 providing push or pull needed at various locations such that the overall pipe is properly supported in the operating condition as well as during transient or short term operating conditions. Combination with other support types may be desired as these may serve special functions such as earthquake protection.

Figure 7:
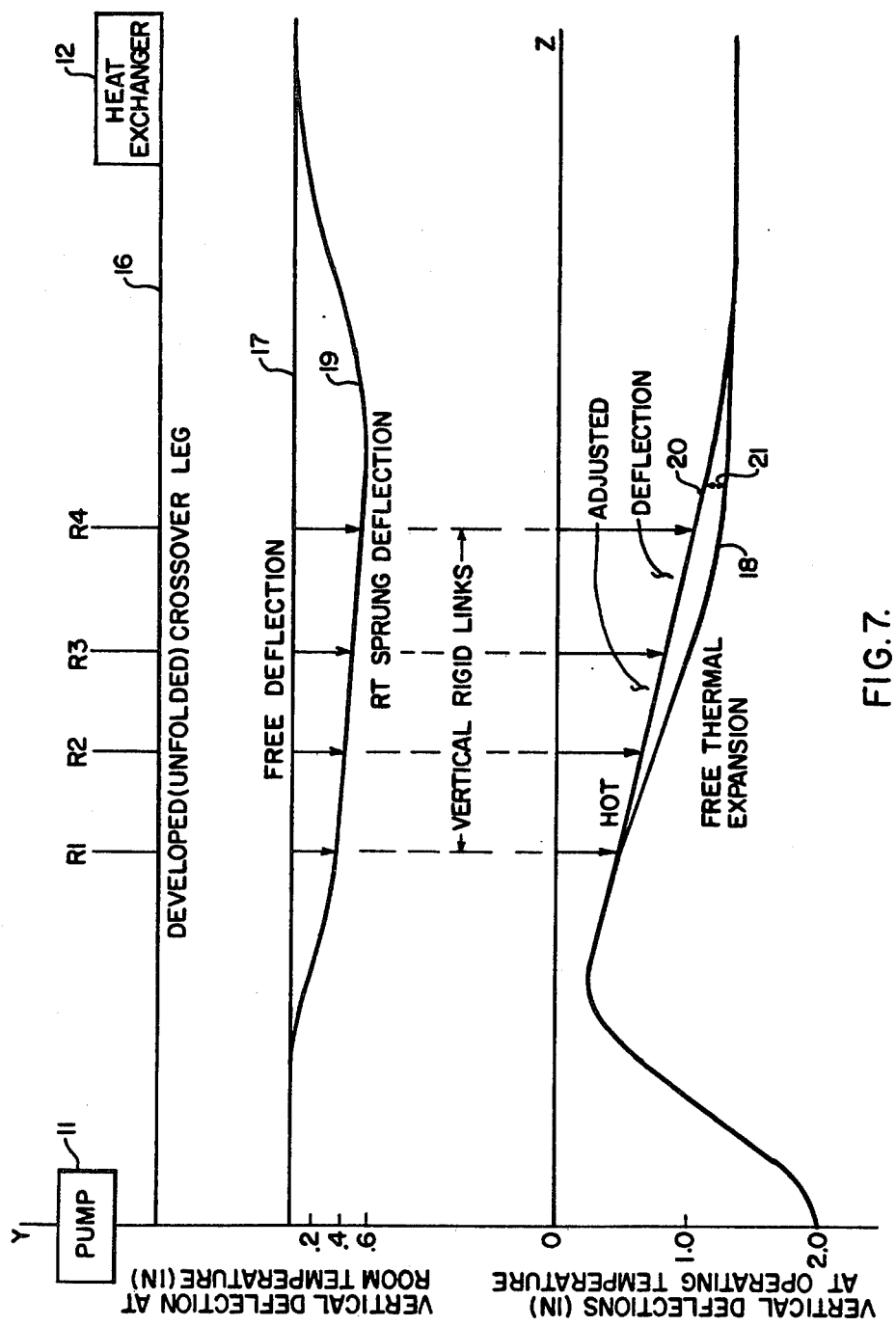
FIG. 7 is a graph of the vertical pipe displacement for the system shown in FIG. 6.

FIG. 7 is a graph which illustrates the use of multiple rigid link supports 8 to support the piping system shown in FIG. 6. FIG. 7 is a two-dimensional representation of the pipe 1 in FIG. 6. Pipe 1 is shown stretched out straight for purposes of this analysis along line 16 which also has pump 11 and heat exchanger 12 positions indicated. Snubber 9 is omitted from FIG. 7 since it provides a special service not relevant to this discussion.

Since in FIG. 7, pipe 1 is a straight run of pipe between pump 11 and heat exchanger 12, the free vertical deflection position (with no supports installed) of pipe 1 at room temperature (line 17) is a horizontal, straight line.

Design analysis of the system is assumed to provide line 18 which is the configuration of pipe 1 in the free (no supports installed) operating temperature condition. Note that pump 11 attachment 27 is known to drop 2 inches from room temperature to operating temperature, while the heat exchanger 12 attachment point 28 drops 1.3 inches. In this particular arrangement, the pipe/free thermal expansion stresses at the operating temperature were found by analysis to be acceptable. This is not necessary for use of rigid link support but merely occurs in this example.

With four rigid link supports (R1, R2, R3, R4) installed, pipe 1 is RT sprung to the deflection from line 17 represented by line 19, the RT sprung deflection. The number, locations, and lengths of rigid link supports R1, R2, R3, R4 are chosen to provide the RT sprung deflection of line 19 because, besides supporting pipe 1 at room temperature, these supports also position pipe 1 at the operating temperature along line 20 which is close to the free deflection line 18. Rigid link supports R1, R2, R3, and R4 are pulling pipe 1 upward, (from free position 18 to operating position 20) providing an operating temperature stress, defined as an "operating temperature sprung" or "OT sprung" condition, and providing pipe 1 with support in the Y direction (see coordinate axes in FIG. 6).

A similar graph could be made of the XZ plane which would be used as a means to pick locations, lengths, and numbers of rigid link supports for support of pipe 1 in that plane.

Application of rigid link supports to vertical piping from the pump of a sodium cooled nuclear reactor entails a modification of the supports.

Figure 8:
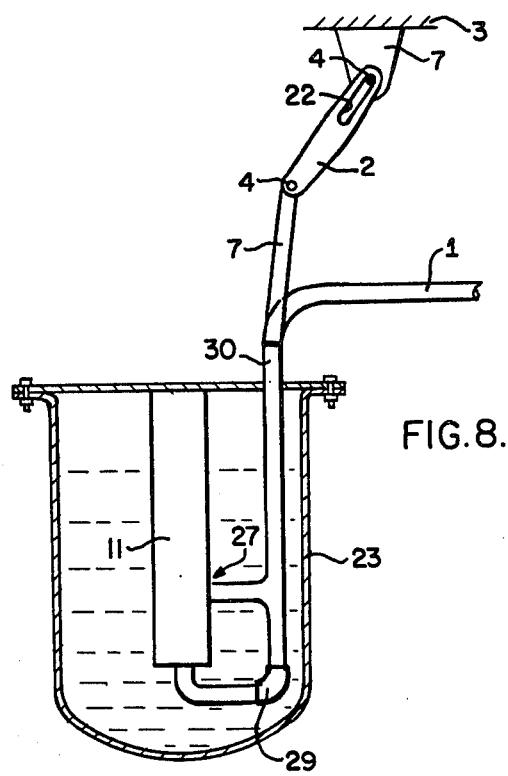
FIG. 8 is a schematic of a slotted rigid link support shown in association with vertical piping.

Refer to FIG. 8 which shows pump 11 surrounded by a guard vessel 23. It is known that pipe support point 30 drops downward by one inch during heatup. It is desired to provide pipe 1 with vertical support at room temperature as well as after the one inch downward movement at operating temperature.

The use of a link in combination with one inch of vertical pump attachment 27 travel could overstress pipe 1, particularly at elbow 29. The solution is as follows: upper mount 7 on anchor 3 (or link 2) has a slot 22. The lower mount 7 fixed to the pipe may be elongated to provide convenient access to pipe 1. Link 2 is attached to mounts 7 with pins 4.

Figure 9:
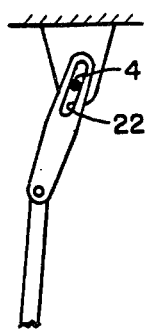
FIGS. 9 and 10 relate to FIG. 8, showing the configuration change which occurs when the pipe changes temperature.
Figure 10:
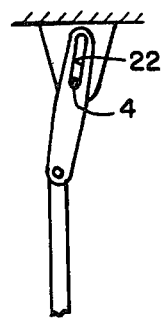

In FIG. 8, the support is shown in an RT sprung condition (pipe pushed down). As pipe 1 moves downward during heatup, as shown in FIG. 9, the stress due to the RT sprung condition is relieved and for an additional range of travel of pipe 1 downward, corresponding to a range of the heatup, no further push or pull is generated because pin 4 and slot 22 do not bear on one another. FIG. 10 shows the configuration after the pipe 1 heatup has reached the temperature where pipe 1 movement downward is sufficient to cause pin 4 to bear on slot 22. Further heatup will generate stress to support pipe 1. The overall effect of slot 22 is to reduce the portion of the one inch downward travel of pipe 1 which is used to generate pipe elbow 29 stress. The use of a slotted link (or a slotted mount) is not restricted to a heatup operation as illustrated, but can also be applied to a cooldown. It can also be used in horizontal configurations.

The configuration shown in FIG. 3 in which link 2 is perpendicular to pipe 1 when pipe 1 is at operating temperature and pipe 1 is therefore under maximum stress is not a necessary condition. It may well be desired for there to remain an unused reserve of pipe stress at operating temperatures so that an accidental temperature increase causes additional pipe motion and stress. Accordingly, it would be planned that link 2 in FIG. 2 would not yet have reached a 90° angle to pipe 1 at operating temperature, or go beyond 90° during the accident, whichever is desired.

Figure 11:
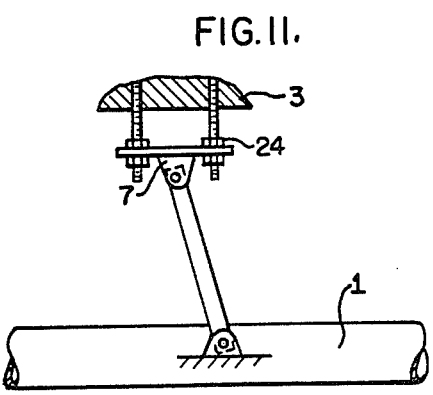
FIG. 11 shows an example of a variable length rigid link support.

While generally a rigid link support will be of a fixed preplanned length, in some applications a variable length link may be desired to allow flexibility in accommodation of operating temperature design changes or even design link length errors. FIG. 11 shows one example of a variable length link support, using a mount 7 having bolts and nuts 24 to vary the standoff distance to anchor surface 3.

Alternatively, flexibility may be achieved by variable length links or by replacing links.

Rigid link supports can be used to support any equipment which exhibits thermal expansion or contraction during heat-up or cooldown to an operating condition, and is not restricted to piping.

The above specification and drawings have indicated the use of an RT sprung condition, but rigid link supports can be installed without such stress at room temperature. The pipe and link can be fully unstressed (except for dead weight) at room temperature if desired (no support needed at room temperature) and this could be the configuration depicted in FIG. 2 if δ is zero.

A primary use of rigid links will be to support piping in liquid metal fast breeder reactor (LMFBR) plants. The following describes an application to the pipe between a primary pump 35 and heat exchanger 36 of an LMFBR.

Figure 12:
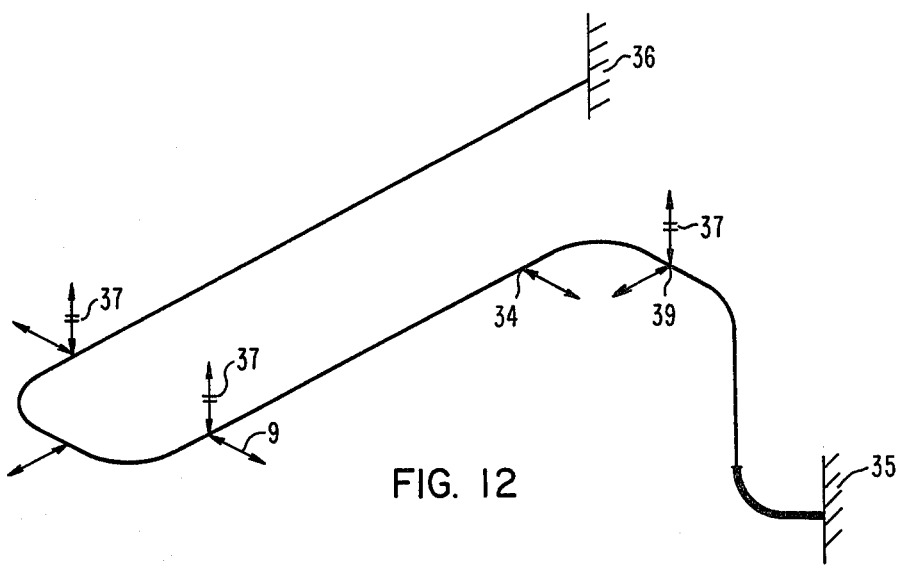
FIGS. 12, 13, 14, 15, and 16 are schematics of a support arrangement for piping between a pump and heat exchanger.

FIG. 12 is the conventional arrangement with snubbers 9 and snubber and hanger combination 37.

Figure 13:
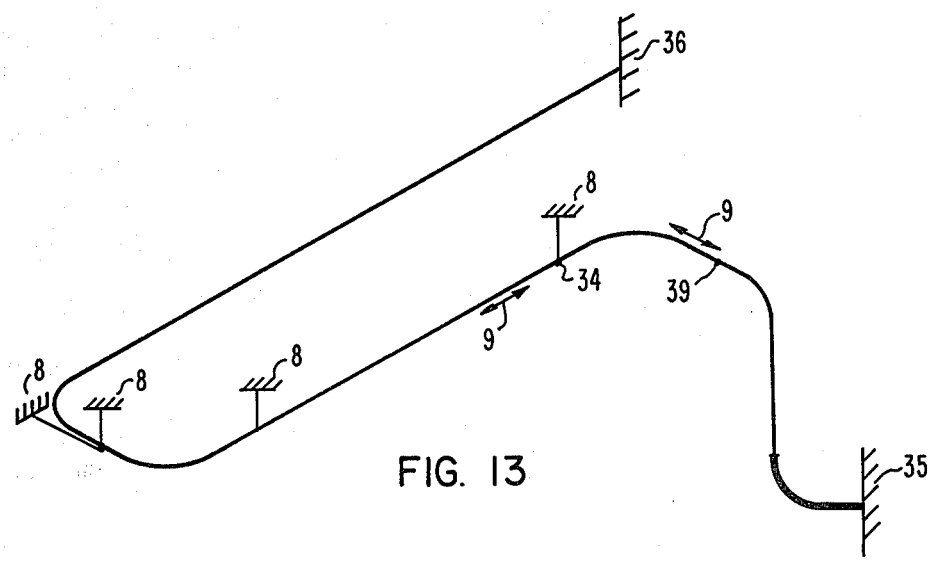
Figure 14:
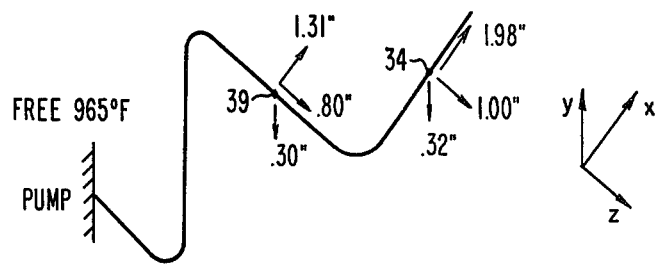
Figure 15:
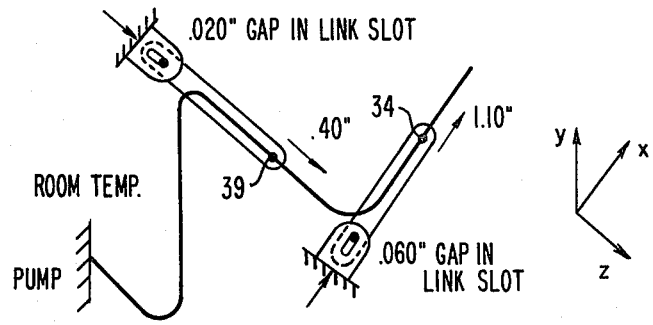
Figure 16:
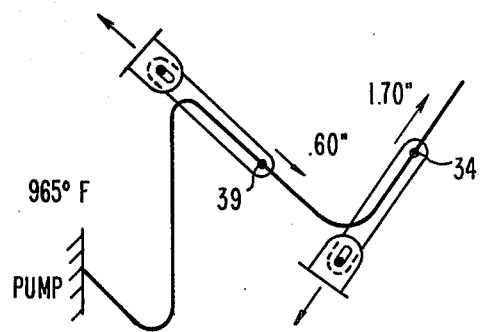

By applying the rigid link concept all three hangers and six of the eight snubbers can be replaced by four rigid links 8, FIG. 13. The next step in this evolution is to eliminate the remaining two snubbers 9 by slotted rigid links. FIGS. 14, 15, and 16 show the mechanics of this approach. FIG. 14 shows the free thermal expansion of points 39 and 34 as the piping system heats up to 965° F. FIG. 15 shows that by cold springing point 39 in the z direction 0.4 inches of the 0.8 inches it wants to move to at 965° F. and by cold spring in a point 34 in the x direction 1.10 inches of the 1.98 inches it wants to grow to at 965° F., the highest elbow stress can be kept to below a reasonable value. As the pipe heats up, the preloads at points 39 and 34 are reduced until about 600° F. where the preloads are zero and the pipe moves freely towards the hot free position. Somewhere around 750° F. the rigid links at points 39 and 34 begin to restrain the thermal growth of the piping system. At full power, 965° F., FIG. 16 shows that there is significant preload at both points 39 and 34 and the highest elbow strees is less than 31,000 psi. A subsequent seismic analysis demonstrated that there was very little lift off and the resulting seismic stress were acceptable. Therefore, FIG. 13 with the two snubbers replaced by gapped rigid links is a viable design. That is, in this particular piping loop three hangers and 8 snubbers were replaced by 6 links (two with gaps). The stress range was higher with links (−30,000 psi cold to +30,000 psi hot) compared to the conventional design (0 cold to +30,000 psi hot). But, if there are *not* many cycles back down to room temperature, this may not be a significant handicap.

Figure 17:
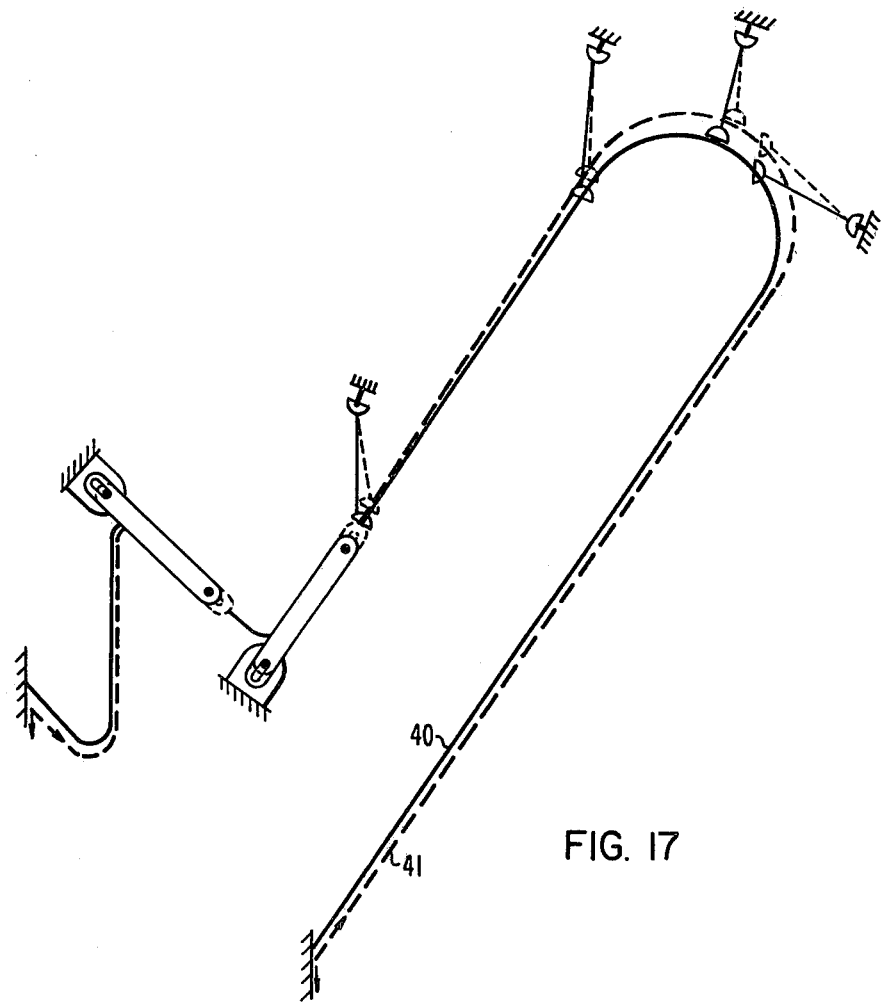
FIG. 17 is a schematic of a support showing the shifting during heatup.

FIG. 17 is a composite of FIGS. 13, through 16 which shows how the pipe shifts from cold (curve 40) to hot (curve 41).

Rigid link supports as described in this specification are susceptible to various modifications without departure from the true spirit and scope of this invention. Therefore this disclosure should be interpreted as illustrative rather than limiting.

I claim:

1. A piping means and support means system for connecting pump means to heat exchanger means in a liquid metal fast breeder reactor, said system comprising:

said piping means of said system having a U-shaped piping section confined to one plane, said U-shaped piping section formed of two straight leg piping sections, a bight piping section joining two ends of said two straight leg piping sections to form said U-shaped piping section, the other end of one of said straight leg piping sections connecting to said pump means through a ninety-degree-bend piping section of said piping means which is located in said one plane, and the other end of the other of said straight leg piping sections connecting to said heat exchanger means;

said support means of said system including a plurality of rigid links which support said piping means from fixed surface means, said rigid links each comprising a rigid link section joined to said piping means by a pivotal connection and also joined to said fixed surface means by a pivotal connection;

one of said rigid links affixed to said piping means proximate the center of said bight piping section and positioned generally perpendicular to said one plane with the pivotal connections to said one rigid link permitting said U-shaped piping section to elongate somewhat in length during reactor operation while maintaining vertical support for said piping means;

another of said rigid links affixed to said piping means proximate the center of said bight piping section and positioned generally in said one plane with the pivotal connections to said second rigid link permitting said U-shaped piping section to elongate somewhat in length during reactor operation while maintaining lateral positioning for said piping means;

remaining of said rigid links affixed in spaced relationship to said U-shaped piping section with the pivotal connections to said remaining rigid links permitting said U-shaped piping section to elongate while maintaining vertical support for same; and additional retaining means connecting said fixed surface means to said piping means on either side of said ninety-degree-bend piping section, and said additional retaining means operable to limit the movement of said ninety-degree-bend piping section of said piping means.

2. A piping means and support means system for connecting pump means to heat exchanger means in a liquid metal fast breeder reactor, said system comprising:

said piping means of said system having a U-shaped piping section confined to one plane, said U-shaped piping section formed of two straight leg piping sections, a bight piping section joining two ends of said two straight leg piping sections to form said U-shaped piping section, the other end of one of said straight leg piping sections connecting to said pump means through a ninety-degree-bend piping section of said piping means which is located in said one plane, and the other end of the other of said straight leg piping sections connecting to said heat exchanger means;

said support means of said system including a plurality of rigid links which support said piping means from fixed surface means, said rigid links each comprising a rigid link section joined to said piping means by a pivotal connection and also joined to said fixed surface means by a pivotal connection;

one of said rigid links affixed to said piping means proximate the center of said bight piping section and positioned generally perpendicular to said one plane with the pivotal connections to said one rigid link permitting said U-shaped piping section to elongate somewhat in length during reactor operation while maintaining vertical support for said piping means;

another of said rigid links affixed to said piping means proximate the center of said bight piping section and positioned generally in said one plane with the pivotal connections to said second rigid link permitting said U-shaped piping section to elongate somewhat in length during reactor operation while maintaining lateral positioning for said piping means;

remaining of said rigid links affixed in spaced relationship to said U-shaped piping section with the pivotal connections to said remaining rigid links permitting said U-shaped piping section to elongate while maintaining vertical support for same; and additional retaining means connecting said fixed surface means to said piping means on either side of said ninety-degree-bend piping section, and said additional retaining means aligned with the portion of said piping means to which connection is made and operable to limit the movement of said ninety-degree-bend piping section of said piping means.

3. The piping means and support means system as specified in claim 2, wherein said additional retaining means comprises snubber means.

4. The piping means and support means system as specified in claim 2, wherein said additional support means comprise rigid links affixed to said piping means and to said fixed surface means by slotted connections which permit only a limited movement of said ninety-degree-bend piping section of said piping means.

5. The piping means and support means system as specified in claim 2, wherein said remaining of said rigid links are affixed in spaced relationship to said one of said straight leg piping sections.

6. The piping means and support means system as specified in claim 2, wherein two additional ninety-degree-bend piping sections of said piping means connect said pump means and said ninety-degree-bend piping section of said piping means which is located in said one plane.

* * * * *